US010063154B2

United States Patent
Ptacek et al.

(10) Patent No.: US 10,063,154 B2
(45) Date of Patent: Aug. 28, 2018

(54) CURRENT SENSE DETECTION FOR SYNCHRONOUS RECTIFICATION

(71) Applicant: SEMICONDUCTOR COMPONENTS INDUSTRIES, LLC, Phoenix, AZ (US)

(72) Inventors: Karel Ptacek, Roznov Pod Radhostem (CZ); Tomas Tichy, Jihlava (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 270 days.

(21) Appl. No.: 15/143,239

(22) Filed: Apr. 29, 2016

(65) Prior Publication Data

US 2017/0317598 A1     Nov. 2, 2017

(51) Int. Cl.
H02M 3/335      (2006.01)
H02M 1/08       (2006.01)
H02M 1/00       (2006.01)

(52) U.S. Cl.
CPC ......... H02M 3/33523 (2013.01); H02M 1/08 (2013.01); *H02M 2001/0009* (2013.01)

(58) Field of Classification Search
CPC ........... H02M 1/08; H02M 2001/0009; H02M 3/33523
See application file for complete search history.

(56) References Cited

U.S. PATENT DOCUMENTS

2014/0192575 A1*    7/2014    Olivik .............. H02M 3/33592
                                                           363/89
2015/0318790 A1     11/2015   Tichy et al.

OTHER PUBLICATIONS

Leadtrend Technology Corporation, "LD8520—Synchronous Rectification Driver with Green Mode Function," Jul. 2015, 13 pages.
Semiconductor Components Industries, LLC, "NCP4305—Secondary Side Synchronous Rectification Driver for High Efficiency SMPS Topolgies," Mar. 2016, Rev. 2, 52 pages.
Sync Power Corporation, "SP6018—Synchronous Rectifier Driver," Jun. 2013, Ver.5, 7 pages.

* cited by examiner

*Primary Examiner* — Adolf Berhane
*Assistant Examiner* — Afework Demisse

(57) ABSTRACT

A power conversion circuit including an SR MOSFET is provided. A minimum off-time timer for the SR MOSFET is started. A voltage potential at a first terminal of the SR MOSFET is measured. The SR MOSFET is turned on after a rate of change over time of the voltage potential exceeds a first threshold and before the minimum off-time timer expires.

20 Claims, 7 Drawing Sheets

CURRENT SENSE DETECTION FOR SYNCHRONOUS RECTIFICATION

BACKGROUND

Semiconductor devices are commonly found in modern electronic products. Semiconductor devices vary in the number and density of electrical components. Discrete semiconductor devices generally contain one type of electrical component, e.g., light emitting diode (LED), small signal transistor, resistor, capacitor, inductor, and power metal oxide semiconductor field effect transistor (MOSFET). Integrated semiconductor devices typically contain hundreds to millions of electrical components. Examples of integrated semiconductor devices include microcontrollers, microprocessors, and various signal processing circuits.

Semiconductor devices perform a wide range of functions such as signal processing, high-speed calculations, transmitting and receiving electromagnetic signals, controlling electronic devices, transforming sunlight to electricity, and creating visual images for television displays. Semiconductor devices are found in the fields of entertainment, communications, power conversion, networks, computers, and consumer products. Semiconductor devices are also found in military applications, aviation, automotive, industrial controllers, and office equipment.

FIG. 1 illustrates electronic device 50 having a chip carrier substrate or printed circuit board (PCB) 52 with a plurality of semiconductor packages mounted on a surface of the PCB. Electronic device 50 can have one type of semiconductor package, or multiple types of semiconductor packages, depending on the application. Different types of semiconductor packages are shown in FIG. 1 for purposes of illustration.

Electronic device 50 can be a stand-alone system that uses the semiconductor packages to perform one or more electrical functions. Alternatively, electronic device 50 can be a subcomponent of a larger system. For example, electronic device 50 can be part of a tablet computer, mobile phone, digital camera, television, or other electronic device. Electronic device 50 can also be a graphics card, network interface card, or other expansion card that is inserted into a personal computer. The semiconductor packages can include microprocessors, memories, application specific integrated circuits (ASIC), programmable logic circuits, analog circuits, radio frequency (RF) circuits, discrete devices, or other semiconductor die or electrical components.

For the purpose of illustration, several types of first level packaging, including bond wire package 56 and flipchip 58, are shown on PCB 52. Additionally, several types of second level packaging, including ball grid array (BGA) 60, bump chip carrier (BCC) 62, land grid array (LGA) 66, multi-chip module (MCM) 68, quad flat non-leaded package (QFN) 70, quad flat package 72, embedded wafer level ball grid array (eWLB) 74, and wafer level chip scale package (WLCSP) 76 are shown mounted on PCB 52. Depending upon the system requirements, any combination of semiconductor packages, configured with any combination of first and second level packaging styles, as well as other electronic components, can be connected to PCB 52.

A manufacturer of electronic device 50 provides a power signal to the electronic device which is used to power the semiconductor packages and other devices disposed on PCB 52. In many cases, the provided power signal is at a different voltage potential than the voltage requirement of the individual semiconductor packages. The manufacturer provides a power converter circuit on PCB 52 to generate a steady direct current (DC) voltage signal at a voltage potential usable by the individual semiconductor packages. Switch-mode power supplies (SMPS) are commonly used due to efficiency advantages.

An SMPS switches an input power signal on and off repeatedly using a primary MOSFET to create a relatively high-frequency power signal. The switched power signal is routed through a transformer or inductor, and then rectified and filtered to create a steady DC power signal. Some prior art power supplies use a conventional diode to perform rectification. However, a diode has a substantially fixed voltage potential between the terminals of the diode, which causes relatively high power losses as output current of the SMPS increases.

Synchronous rectification is used as an alternative to diode rectification in many SMPS topologies. Synchronous rectification uses a synchronous rectification (SR) MOSFET, enhancement mode gallium arsenide transistor, or other electronically controlled switch to enable secondary current when secondary current is flowing in the appropriate direction. When turned on, an SR MOSFET has a relatively low resistance that is substantially constant, and generally produces a significantly lower voltage drop across the SR MOSFET than a diode. Accordingly, synchronous rectification is generally more efficient than using a diode for rectification.

An SR controller turns the SR MOSFET on and off based on the voltage potential between the drain and source terminals of the SR MOSFET. When the drain-to-source voltage of the SR MOSFET drops below zero volts, the SR controller turns on the SR MOSFET. However, parasitic ringing during and after primary or SR MOSFET switching can cause the voltage across the SR MOSFET to cross the zero volt threshold several times during one SMPS switching period. If no system for ignoring the ringing is implemented, the SR controller may switch the SR MOSFET on or off at incorrect times. Turning on the SR MOSFET when the SR MOSFET should not be conducting results in current from the voltage output being routed to a ground node. Turning off the SR MOSFET when the SR MOSFET should be conducting results in current conducting through the body diode of the SR MOSFET, which has a larger voltage drop. In either case, the overall efficiency of the system is reduced.

Some SR controllers implement a minimum off-time and minimum on-time for the SR MOSFET. The minimum off-time is set larger than the expected drain-to-source voltage ringing time so that transitions across the zero volt threshold are ignored until the ringing is reduced to a safe magnitude. A problem exists with flyback type converters that operate on a variable output voltage. When output voltage is reduced, the primary MOSFET on-time may be reduced as well. If the on-time of the primary MOSFET is reduced below the minimum off-time for the SR MOSFET as set in the SR controller, the SR controller misses signal transitions that should cause the SR MOSFET to turn on, but that occur within the minimum off-time. The SR controller does not operate properly, and efficiency is significantly reduced.

SUMMARY

A need exists for an improved system to detect transitions of a switch-mode power supply for synchronous rectification while ignoring ringing on the synchronous rectification MOSFET. Accordingly, in one embodiment, the present disclosure is a method of generating a voltage signal comprising the steps of providing a power conversion circuit including a synchronous rectification (SR) MOSFET, comparing a voltage potential of the SR MOSFET against a first threshold, comparing the voltage potential of the SR MOSFET against a second threshold, measuring a first amount of time between the voltage potential of the SR MOSFET crossing the first threshold and the voltage potential of the SR MOSFET crossing the second threshold, and turning on the SR MOSFET after at least one of either a minimum off-time of the SR MOSFET is exceeded or the first amount of time is measured below a third threshold.

In another embodiment, the present disclosure is a method of generating a voltage signal comprising the steps of providing a power conversion circuit including a transistor, starting a minimum off-time timer for the transistor, measuring a voltage potential at a first terminal of the transistor, and turning on the transistor after a rate of change over time of the voltage potential exceeds a first threshold.

In another embodiment, the present disclosure is a power conversion circuit comprising an SR MOSFET including a conduction terminal. A first comparator includes a first input coupled to the conduction terminal and a second input of the first comparator coupled to a first reference voltage potential. A second comparator includes a first input coupled to the conduction terminal and a second input of the second comparator coupled to a second reference voltage potential. A timer is coupled to an output of the first comparator and an output of the second comparator.

DETAILED DESCRIPTION OF THE DRAWINGS

The following describes one or more embodiments with reference to the figures, in which like numerals represent the same or similar elements. While the figures are described in terms of the best mode for achieving certain objectives, the description is intended to cover alternatives, modifications, and equivalents as may be included within the spirit and scope of the disclosure.

Figure 1:
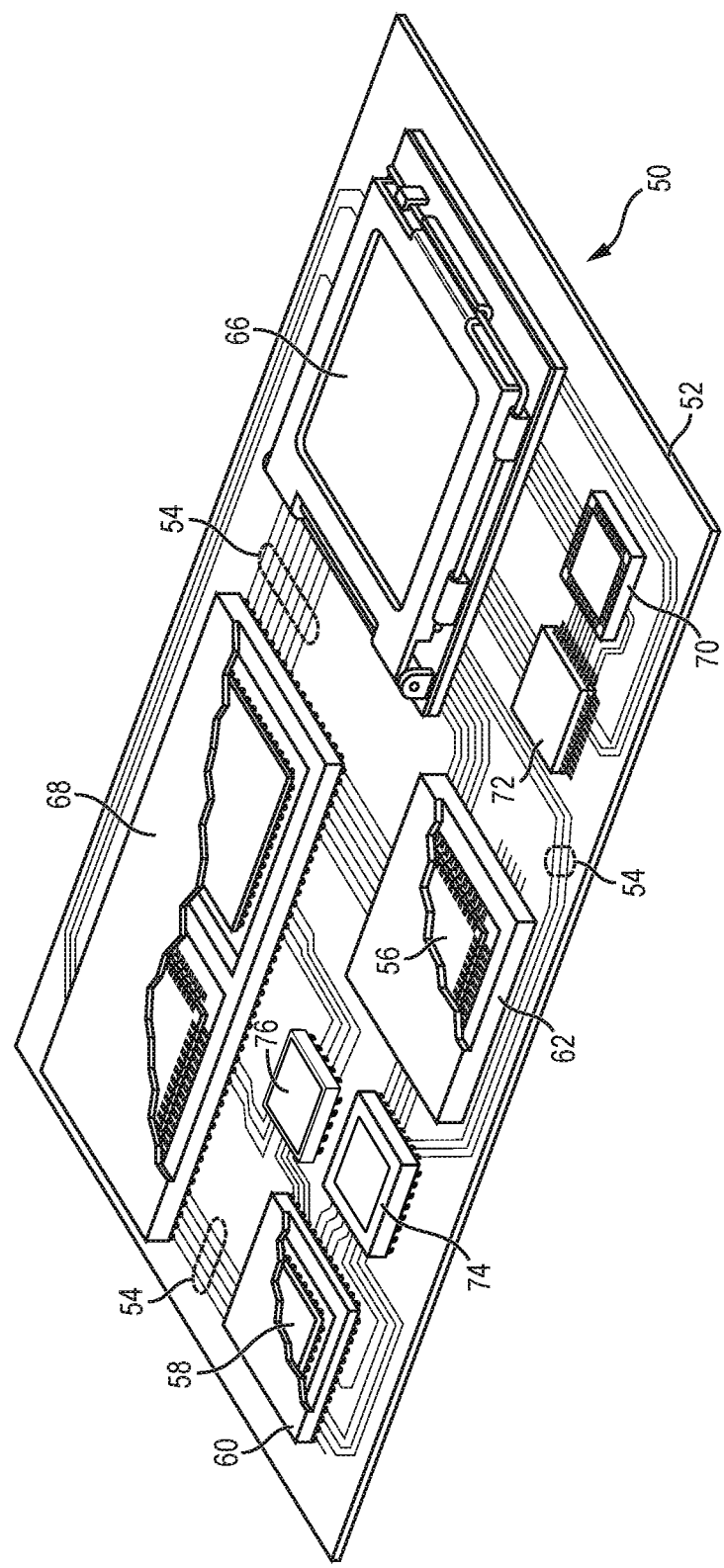
FIG. 1 illustrates an exemplary circuit board that uses a switch-mode power supply (SMPS)
Figure 2:
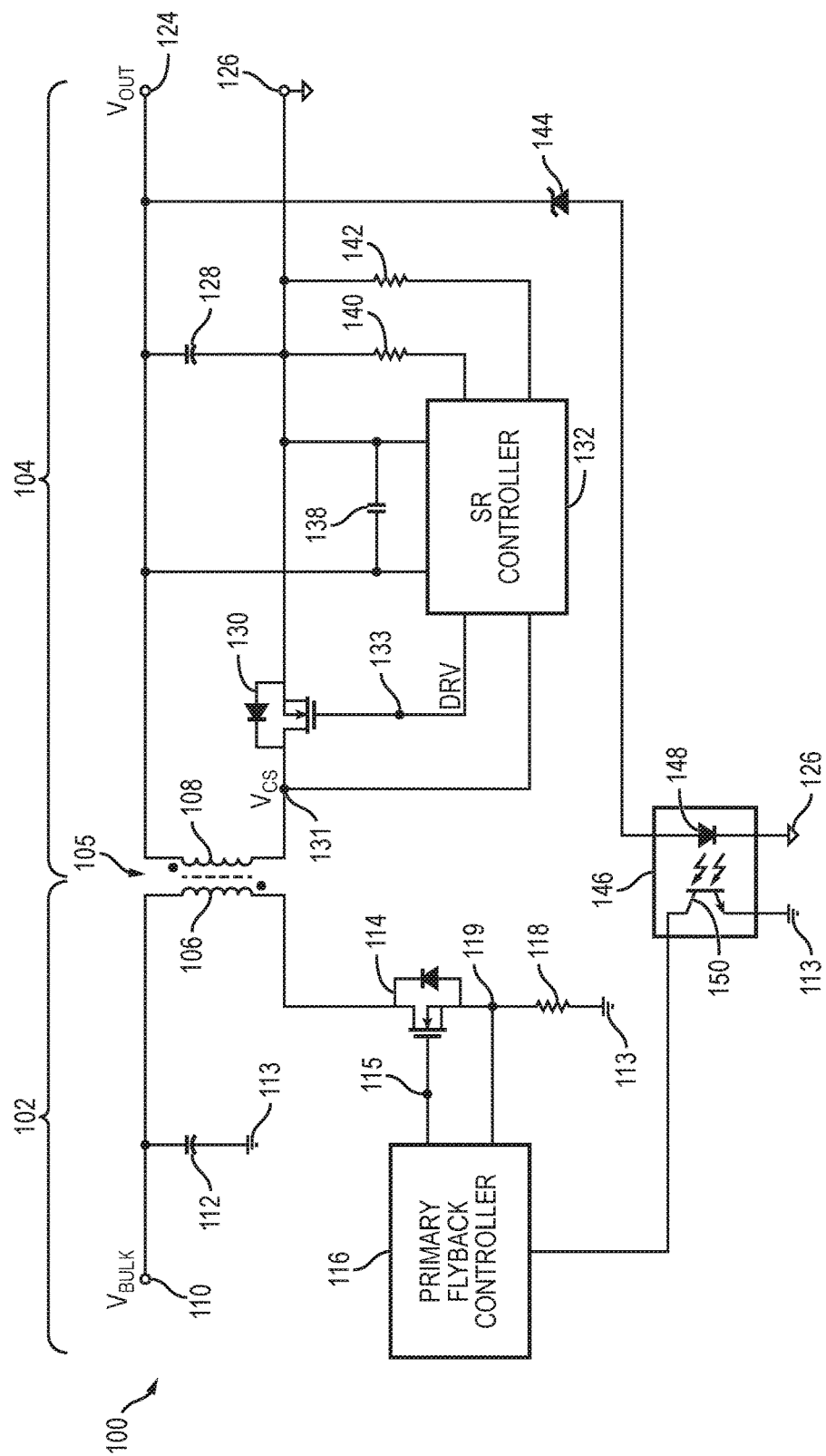
FIG. 2 illustrates a flyback topology SMPS with synchronous rectification.

FIG. 2 illustrates a block and circuit diagram of a switch-mode power supply (SMPS) 100. While a flyback topology SMPS 100 is illustrated, the disclosed synchronous rectification (SR) method is used with other SMPS topologies in other embodiments. SMPS 100 is split into a primary side 102 and a secondary side 104, which are delineated by transformer 105. Transformer 105 includes a primary winding 106 as part of primary side 102 and a secondary winding 108 as part of secondary side 104. Primary side 102 of SMPS 100 is made up of the components electrically connected to primary winding 106. Secondary side 104 of SMPS 100 is made up of the components electrically connected to secondary winding 108. Transformer 105 provides DC isolation between primary side 102 and secondary side 104. Alternating current (AC) signals through primary winding 106 are transferred to secondary winding 108 by magnetic coupling while any DC offset is substantially ignored.

Primary side 102 includes a power input at bulk voltage ($V_{BULK}$) node 110. In some embodiments, $V_{BULK}$ node 110 receives a rectified AC power signal provided by an electric utility at, e.g., 110 or 220 volts AC. The AC electric signal is routed to a residence, commercial office building, or other premises by power mains and input to the electronic device including SMPS 100 by plugging the device into a wall outlet. A diode bridge or other rectifier circuit rectifies the input AC main signal to include positive voltage values at $V_{BULK}$ node 110. In other embodiments, a power signal is provided to $V_{BULK}$ node 110 by other means. A capacitor 112 is coupled between $V_{BULK}$ node 110 and ground node 113 to further filter the input power signal.

Electric current from $V_{BULK}$ node 110 through primary winding 106 to ground node 113 is turned on and off by primary MOSFET 114. Primary MOSFET 114 includes a drain terminal coupled to primary winding 106 opposite $V_{BULK}$ node 110, a gate terminal coupled to primary flyback controller 116 at circuit node 115, and a source terminal coupled to resistor 118 at circuit node 119. The source and drain terminals of primary MOSFET 114 are conduction terminals, and the gate is a control terminal. Controller 116 turns on, or enables electric conduction through, primary MOSFET 114 by providing a positive voltage potential at the gate terminal of the MOSFET via circuit node 115. When primary MOSFET 114 is turned on, electric current flows from $V_{BULK}$ node 110 to ground node 113 through primary winding 106, primary MOSFET 114, and resistor 118. Controller 116 turns off primary MOSFET 114 by outputting a ground voltage potential to the gate of primary MOSFET 114. While primary MOSFET 114 is off, no significant current flows from $V_{BULK}$ node 110 through primary winding 106. While an re-channel MOSFET is illustrated, current through primary winding 106 is switched by other types of electronic switches in other embodiments, e.g., bipolar junction transistors, junction-field effect transistors, gallium arsenide transistors, and other types of transistors.

Controller 116 determines when to switch primary MOSFET 114 by observing the magnitude of current through primary winding 106. Resistor 118 creates a voltage potential difference between ground node 113 and circuit node 119 when current flows through the resistor. The voltage potential across resistor 118, as observed at circuit node 119, is approximately proportional to the current through primary winding 106 and resistor 118. Circuit node 119 is coupled to a current sense input pin of controller 116. Controller 116 observes the voltage potential at circuit node 119 to determine the electric current magnitude through primary winding 106.

While controller 116 has primary MOSFET 114 turned on, electric current through primary winding 106 increases and magnetizes transformer 105. When controller 116 turns off primary MOSFET 114, electric current through primary winding 106 is substantially stopped. The magnetic energy stored in transformer 105 is output as electric current through secondary winding 108, creating a positive voltage potential at voltage output ($V_{OUT}$) node 124 relative to ground node 126. The voltage potential at $V_{OUT}$ node 124 charges capacitor 128 and powers additional circuit components of electronic device 50 connected to SMPS 100 as a load. The cycle repeats when controller 116 turns on primary MOSFET 114 to again magnetize transformer 105. Capacitor 128 provides power to $V_{OUT}$ node 124 while primary MOSFET 114 is on.

Secondary side 104 of SMPS 100 includes SR MOSFET 130. SR MOSFET 130 has a drain terminal coupled to secondary winding 108 at current sense voltage ($V_{CS}$) node 131, a source terminal coupled to ground node 126, and a gate terminal coupled to SR controller 132 at circuit node 133. SR MOSFET 130 is turned on by SR controller 132 to allow electric current to flow from ground node 126 to $V_{OUT}$ node 124 while the magnetic energy stored in transformer 105 is output to secondary side 104. SR controller 132 turns off SR MOSFET 130 while primary MOSFET 114 is on, and transformer 105 is being magnetized, to reduce electric charge from $V_{OUT}$ node 124 flowing back to ground node 126. The switching of SR MOSFET 130 by SR controller 132 provides synchronous rectification of electric current through secondary winding 108.

SR controller 132 determines when to turn SR MOSFET 130 on and off by observing the voltage potential at $V_{CS}$ node 131. In some embodiments, a current sense resistor is used between $V_{CS}$ node 131 and SR controller 132 to shift the voltage potential observed by SR controller 132. Primary flyback controller 116 turns off primary MOSFET 114 once transformer 105 is sufficiently magnetized, and electric current through secondary winding 108 begins to increase as the magnetic energy stored in transformer 105 is released to secondary side 104. As current through secondary winding 108 increases, the voltage potential at $V_{CS}$ node 131 is reduced relative to ground node 126. SR controller 132 detects the reduction of voltage potential at $V_{CS}$ node 131 falling below a turn-on threshold and turns SR MOSFET 130 on to allow current to flow from ground node 126 to $V_{OUT}$ node 124 through secondary winding 108. The voltage potential at $V_{CS}$ node 131 increases above a turn-off threshold when SMPS completes the transfer of energy from transformer 105 to secondary side 104, and SR controller 132 switches SR MOSFET 130 back off.

SR controller 132 includes additional power and ground inputs attached to $V_{OUT}$ node 124 and ground node 126, respectively. A decoupling capacitor 138 is coupled between ground node 126 and $V_{OUT}$ node 124 near SR controller 132 to facilitate switching of SR MOSFET 130. A min_ton input of SR controller 132 is coupled to ground node 126 through resistor 140. The resistance value of resistor 140 dictates a minimum on-time (min_ton) that SR controller 132 uses to keep SR MOSFET 130 turned on for a minimum amount of time each power cycle of SMPS 100. A min_toff input of SR controller 132 is coupled to ground node 126 through resistor 142. The resistance value of resistor 142 dictates a minimum off-time (min_toff) that SR controller 132 uses to keep SR MOSFET 130 turned off for a minimum amount of time each power cycle of SMPS 100.

The minimum on-time and minimum off-time, as set by resistors 140 and 142, create periods of time after each transition of the control signal at circuit node 133 during which SR controller 132 will refrain from switching SR MOSFET 130. $V_{CS}$ node 131 commonly includes transient oscillations or ringing after switching of primary MOSFET 114 or SR MOSFET 130. The minimum on-time and minimum off-time set by resistors 140 and 142 causes SR controller 132 to ignore transient ringing on $V_{CS}$ node 131 shortly after transitions, while reacting to transitions that occur as a result of normal operation of SMPS 100.

In some instances, primary MOSFET 114 is turned on to start a new power cycle before the minimum off-time of SR MOSFET 130, as set by resistor 142, is exceeded. SR controller 132 is configured to ignore the minimum off-time in cases when transitions of primary MOSFET 114 occur prior to expiration of the minimum off-time. SR controller 132 differentiates between valid transitions of primary MOSFET 114 observed at $V_{CS}$ node 131, and transient ringing on $V_{CS}$ node 131, by calculating the slope of the observed signal. The voltage potential at $V_{CS}$ node 131 drops significantly more rapidly when primary MOSFET 114 is turned off than during transient ringing. SR controller 132 ignores the minimum off-time and turns on SR MOSFET 130 when the voltage potential at $V_{CS}$ node 131 falls faster than a predetermined rate threshold.

Feedback is provided from secondary side 104 to primary side 102 by Zener diode 144 and optocoupler 146. Optocoupler 146 includes an LED 148 and a phototransistor 150. If the voltage potential at $V_{OUT}$ node 124 exceeds the Zener voltage of Zener diode 144 summed with the voltage drop of LED 148, current flows through Zener diode 144 and LED 148 in series. Light emitted by LED 148 hits phototransistor 150, which turns on the phototransistor and increases the coupling of a feedback input of primary flyback controller 116 to ground node 113. The feedback signal tells primary flyback controller 116 that a desired voltage potential at $V_{OUT}$ node 124 is exceeded, and the amount of energy transferred from primary side 102 to secondary side 104 can be reduced. An optocoupler is used to maintain galvanic isolation between primary side 102 and secondary side 104. In other embodiments, other forms of isolation are used to provide a feedback signal.

Figure 3A:
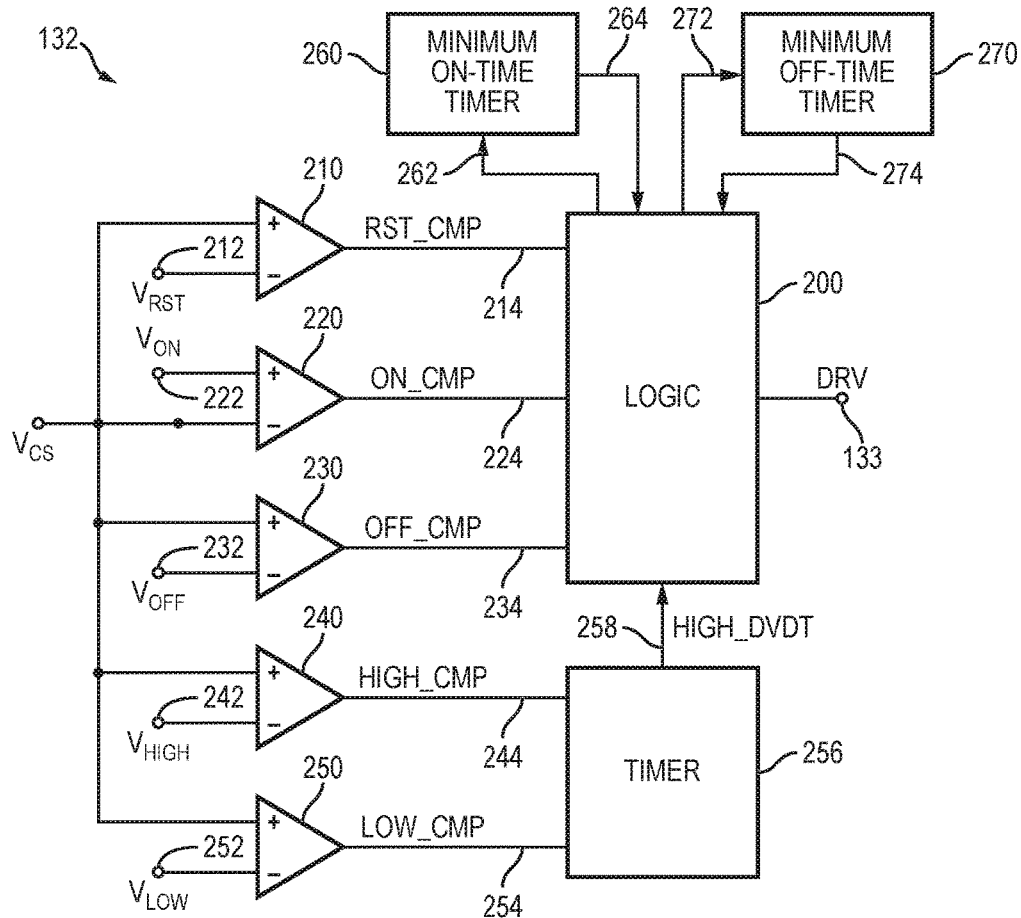
FIGS. 3a-3b illustrate a synchronous rectification controller.

FIG. 3a illustrates SR controller 132 in further detail. An internal logic block 200 receives input from a variety of comparators that compare the voltage potential at $V_{CS}$ node 131 against different voltage potential thresholds. Logic block 200 generates the DRV output at circuit node 133 to control SR MOSFET 130. In some embodiments, additional driver circuitry is coupled between logic block 200 and SR MOSFET 130 to generate the current or voltage necessary to drive the SR MOSFET. Logic block 200 represents a hardware component designed to implement synchronous rectification functionality. In one embodiment, logic block 200 is an arithmetic logic unit or other computer processor executing software corresponding to the functionality of logic block 200. In other embodiments, logic block 200 is implemented in hardware as a finite state machine on an ASIC or field-programmable gate array (FPGA).

Reset comparator 210 compares a voltage potential on $V_{CS}$ node 131 against a reset threshold voltage ($V_{RST}$) 212 and outputs RST_CMP signal 214 to logic block 200. Turn-on comparator 220 compares $V_{CS}$ node 131 against a turn-on threshold voltage ($V_{ON}$) 222 and outputs ON_CMP signal 224 to logic block 200. Turn-off comparator 230 compares $V_{CS}$ node 131 against a turn-off threshold voltage ($V_{OFF}$) 232 and outputs OFF_CMP signal 234 to logic block 200. High voltage comparator 240 compares $V_{CS}$ node 131 against a high voltage threshold ($V_{HIGH}$) 242 and outputs HIGH_CMP signal 244. Low voltage comparator 250 compares $V_{CS}$ node 131 against a low voltage threshold ($V_{LOW}$) 252 and outputs LOW_CMP signal 254.

HIGH_CMP signal 244 and LOW_CMP signal 254 are routed through timer 256 to calculate the rate of change of the voltage potential at $V_{CS}$ node 131 over time (dV/dt). The dV/dt of $V_{CS}$ node 131 is calculated by subtracting $V_{HIGH}$ 242 from $V_{LOW}$ 252 and dividing by the time that elapses between transitions of HIGH_CMP signal 244 and LOW_CMP 254. Timer 256 asserts HIGH_DVDT signal 258 to logic block 200 if dV/dt of $V_{CS}$ node 131 is detected to be above a configured threshold. In one embodiment, $V_{HIGH}$ 242 is fixed at 3 volts and $V_{LOW}$ 252 is fixed at 0.5 volts. With $V_{ON}$ 222 and $V_{OFF}$ 232 set to known voltage thresholds, timer 256 asserts HIGH_DVDT signal 258 if the amount of time between a transition of HIGH_CMP signal 244 and a transition of LOW_CMP signal 254 is less than a set time threshold without having to subtract the voltages and divide by time. Timer 256 may be an analog or digital timing circuit in different embodiments. Timer 256 is started by a transition of HIGH_CMP signal 244. Timer 256 asserts HIGH_DVDT if a timer value is below a threshold, or a calculated dV/dt value is above a threshold, when a transition of LOW_CMP signal 254 is received.

Minimum on-time timer 260 receives an ON_START signal 262 from logic block 200 and returns an ON_DONE signal 264 to logic block 200 when the minimum on-time has elapsed. Minimum off-time timer 270 receives an OFF_START signal 272 from logic block 200 and returns an OFF_DONE signal 274 to logic block 200 when the minimum off-time has elapsed.

Figure 3B:
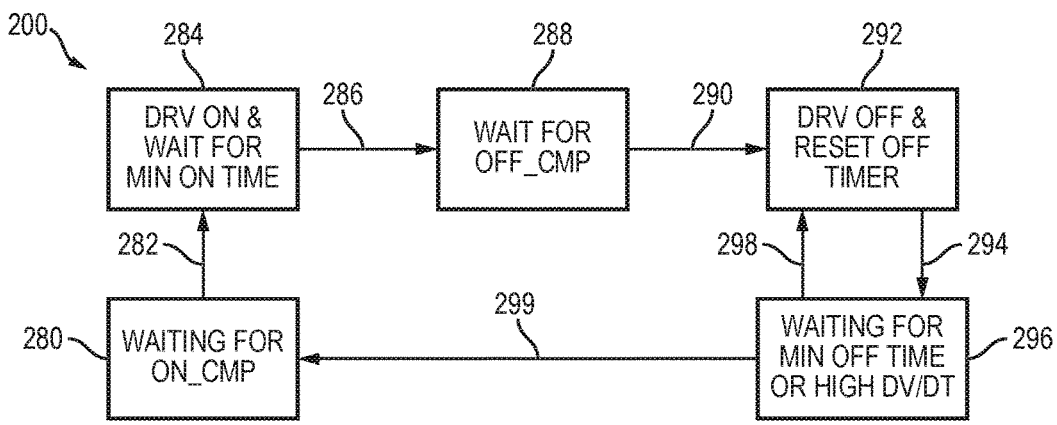

Operation of the various inputs and outputs of logic block 200 is explained with the aid of the state diagram in FIG. 3b. A power cycle of SMPS 100 begins with primary flyback controller 116 turning on primary MOSFET 114. If SMPS 100 is operating in discontinuous current mode (DCM), SR MOSFET 130 was previously turned off when the magnetic energy stored in transformer 105 was exhausted into secondary side 104. If SMPS 100 is operating in continuous current mode (CCM), SR MOSFET 130 is turned off when primary MOSFET 114 is turned on by the voltage at $V_{CS}$ node 131 rising above $V_{OFF}$ 232. In either CCM or DCM, logic block 200 is in state 280 once primary MOSFET 114 is on.

In state 280, logic block 200 is waiting for ON_CMP signal 224 to become a logic one value. ON_CMP signal 224 is output by turn-on comparator 220 based on a comparison between $V_{ON}$ 222 and the voltage potential of $V_{CS}$ node 131. While MOSFET 114 is on and charging transformer 105, the voltage of $V_{CS}$ node 131 increases due to magnetic coupling between primary winding 106 and secondary winding 108. SR MOSFET 130 is turned off to reduce electric current from $V_{OUT}$ node 124 to ground node 126. Voltage potential at $V_{CS}$ node 131 is held near a positive peak, and is significantly above $V_{ON}$ 222. When primary MOSFET 114 is on, ON_CMP signal 224 is a binary zero value because $V_{ON}$ 222 is a lower voltage potential than $V_{CS}$ node 131.

When primary MOSFET 114 is turned off, transformer 105 begins discharging stored magnetic energy into secondary side 104. The voltage potential at $V_{CS}$ node 131 falls relatively rapidly because an electric current is induced in secondary winding 108 from $V_{CS}$ node 131 to $V_{OUT}$ node 124. The voltage potential at $V_{CS}$ node 131 falls to the level of $V_{ON}$ 222 relatively quickly, and ON_CMP signal 224 transitions to a logic one value. In state 280, logic block 200 is waiting for ON_CMP signal 224 to become a logic one, and so takes transition 282 to state 284.

In state 284, logic block 200 asserts DRV signal 133 to turn on SR MOSFET 130 and allow the current induced in secondary winding 108 to pull electric charge from ground node 126 and push the electric charge to $V_{OUT}$ node 124. Logic block 200 also asserts ON_BEGIN signal 262 as an electric pulse or signal transition to start minimum on-time timer 260. In state 284, logic block 200 waits for minimum on-time timer 260 to assert ON_DONE signal 264 to ensure that the minimum on-time is observed. Keeping SR MOSFET 130 on for a minimum on-time without regard to the voltage potential of $V_{CS}$ node 131 allows logic block 200 to ignore transient signals on $V_{CS}$ node 131, which may occur for a short time after SR MOSFET 130 is turned on.

In one embodiment, minimum on-time timer 260 determines the minimum on-time by discharging a capacitor through resistor 140. Smaller values of resistor 140 cause the capacitor in minimum on-time timer 260 to discharge more quickly and result in a shorter minimum on-time. Larger resistor 140 values slow the capacitor discharge and result in a longer minimum on-time. Other types of analog timers are used in other embodiments. In some embodiments, a digital timing circuit is used for minimum on-time timer 260. A digital timer may be set by a register value within logic block 200 rather than an external resistor 140.

With the minimum on-time satisfied, as indicated by ON_DONE signal 264, logic block 200 takes transition 286 to state 288. In state 288, logic block 200 waits for OFF_CMP signal 234. OFF_CMP signal 234 is a logic zero value when SR MOSFET 130 is turned on because $V_{OFF}$ 232 is a greater voltage potential than $V_{ON}$ 222. In some embodiments, $V_{OFF}$ 232 is at the voltage potential of ground node 126 or a slightly negative voltage potential. As transformer 105 discharges magnetic energy to secondary side 104, current through secondary winding 108 slows and the voltage potential at $V_{CS}$ node 131 approaches zero. In DCM, the voltage potential at $V_{CS}$ node 131 crosses $V_{OFF}$ 232 once transformer 105 is nearly fully discharged. In CCM, the voltage potential at $V_{CS}$ node 131 crosses $V_{OFF}$ 232 when primary MOSFET 114 is switched back on. In either case, OFF_CMP signal 234 becomes a logic one value when the voltage potential of $V_{CS}$ node 131 crosses $V_{OFF}$ 232, and logic block 200 takes transition 290 to state 292.

In state 292, logic block 200 outputs a ground signal at DRV circuit node 133 to turn off SR MOSFET 130, thus reducing electric current returning from $V_{OUT}$ node 124 to ground node 126. Logic block 200 also asserts OFF_START signal 272 to reset minimum off-time timer 270. OFF_START signal 272 is maintained as asserted while logic block 200 is in state 292. Minimum off-time timer 270 operates similarly to minimum on-time timer 260, and may be either an analog or digital timing circuit.

Logic block 200 takes transition 294 to state 296 once RST_CMP signal 214 is asserted by the voltage potential at $V_{CS}$ node 131 increasing to above $V_{RST}$ 212. In state 296, minimum off-time timer 270 begins timing and logic block 200 waits for either RST_CMP signal 214 to go low, OFF_DONE signal 274 to go high, or HIGH_DVDT signal 258 to go high. RST_CMP signal 214 is high if the voltage potential at $V_{CS}$ node 131 exceeds $V_{RST}$ 212. While RST_CMP signal 214 is high, any transient ringing of $V_{CS}$ node 131 is far enough away from $V_{ON}$ 222 that the risk of the ringing triggering SR controller 132 to turn on SR MOSFET 130 is low. However, if ringing on $V_{CS}$ node 131 reduces the voltage potential of $V_{CS}$ node 131 below $V_{RST}$ 212, RST_CMP signal 214 goes low and logic block 200 recognizes a risk that the oscillations could also send the voltage potential of $V_{CS}$ node 131 below $V_{ON}$ 222.

When RST_CMP signal 214 goes low, logic block 200 returns to state 292 via transition 298 to reset minimum off-time timer 270. Minimum off-time timer 270 is reset via OFF_START signal 272, and logic block 200 returns to state 296 once the voltage potential of $V_{CS}$ node 131 returns above $V_{RST}$ 212. The minimum off-time is set slightly larger than the expected transient oscillation period of $V_{CS}$ node 131. The minimum off-time is not considered exceeded until the voltage potential at $V_{CS}$ node 131 goes longer than one full oscillation period without falling below $V_{RST}$ 212. The transient oscillation period is approximately constant based on inherent capacitance of SR MOSFET 130, the inductance value of secondary winding 108, and other parasitic electrical characteristics of SMPS 100.

Meanwhile, if logic block 200 receives either HIGH_DVDT signal 258 or OFF_DONE signal 274 while in state 296, logic block 200 takes transition 299 and returns to state 280. The OFF_DONE signal 274 indicates that the minimum off-time expired without being reset by RST_CMP signal 214. Once the minimum off-time expires, transients on $V_{CS}$ node 131 are unlikely to trigger turn-on comparator 220 and incorrectly turn on SR MOSFET 130. Logic block 200 advances to state 280 and can safely assume the next time ON_CMP signal 224 is a logic one value is when SR MOSFET 130 should be turned on, and not a transient oscillation on $V_{CS}$ node 131.

HIGH_DVDT signal 258 may also cause logic block 200 to advance to state 280 via transition 299. The dV/dt of transient oscillations on $V_{CS}$ node 131 is significantly lower than the dV/dt observed at $V_{CS}$ node 131 when primary MOSFET 114 is turned off and SR MOSFET 130 should be turned on. If dV/dt above a set threshold is observed, indicative of primary MOSFET 114 turning off, logic block 200 advances to state 280 even though the minimum off-time has not elapsed. The higher dV/dt indicates that the voltage change observed at $V_{CS}$ node 131 is the result of a legitimate transition of primary MOSFET 114 rather than transient ringing. Logic block 200 advances to state 280 so that SR MOSFET 130 will be turned on once the falling voltage potential at $V_{CS}$ node 131 crosses $V_{ON}$ 222.

Figure 4A:
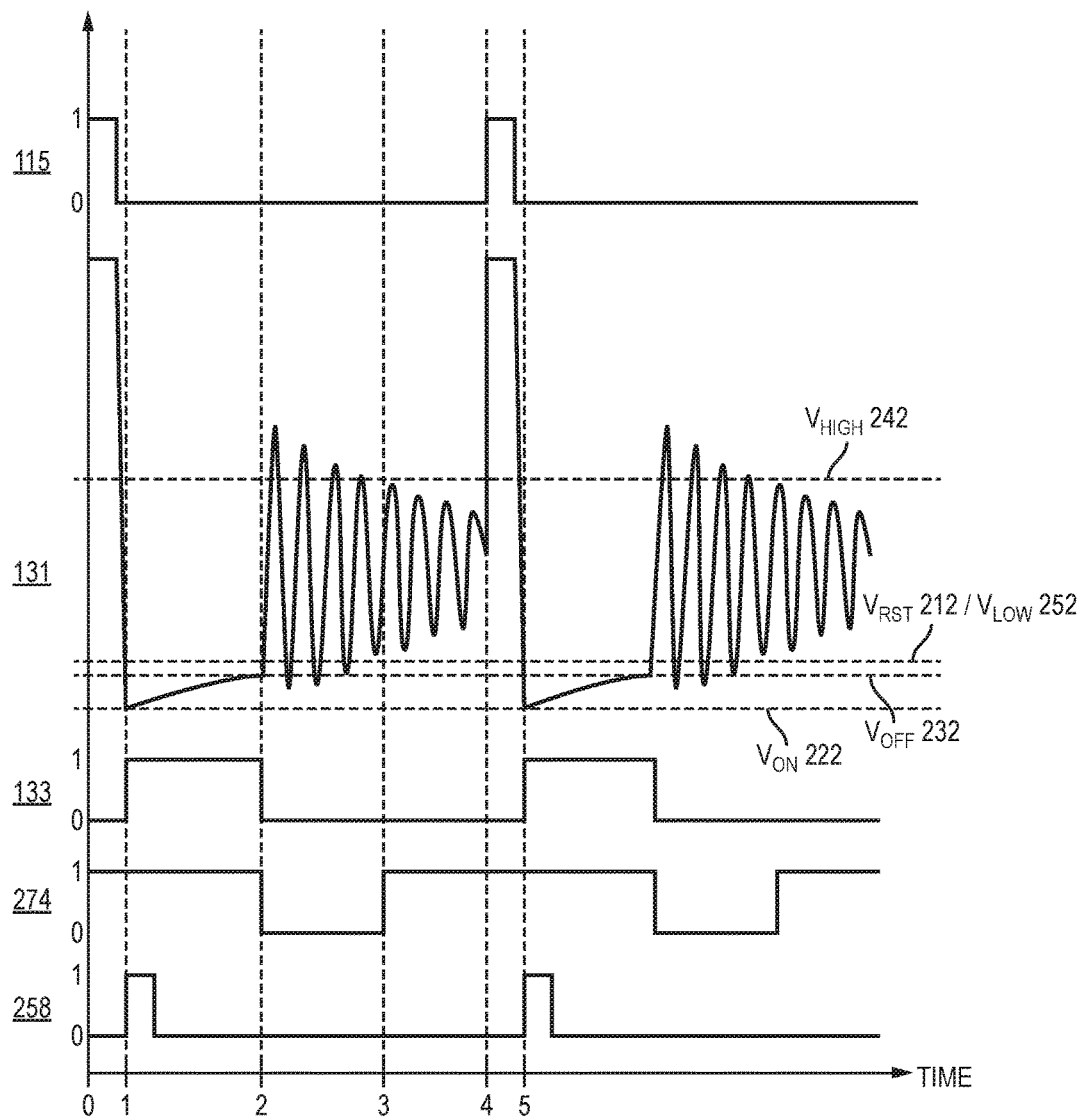
FIGS. 4a-4c illustrate timing diagrams of synchronous rectification operated by a controller using a current sense input.
Figure 4B:
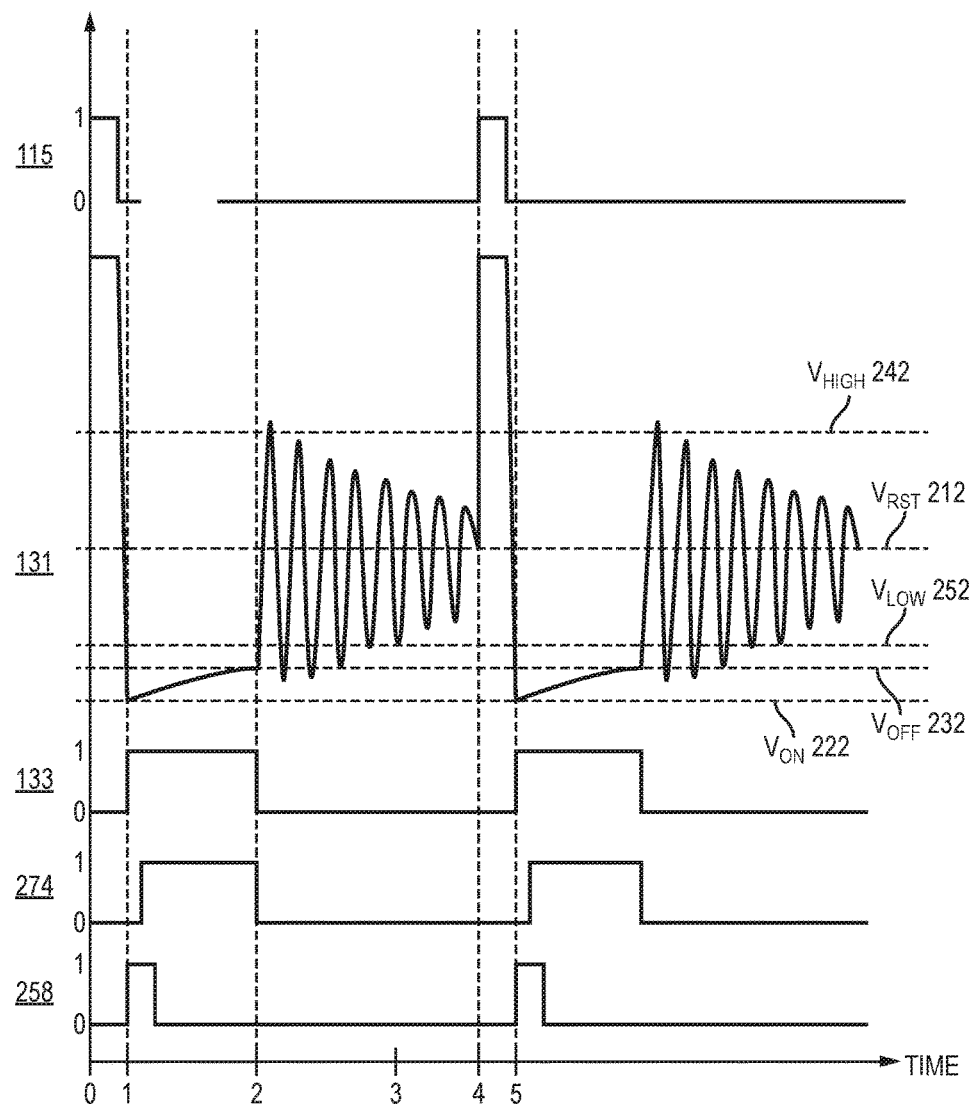
Figure 4C:
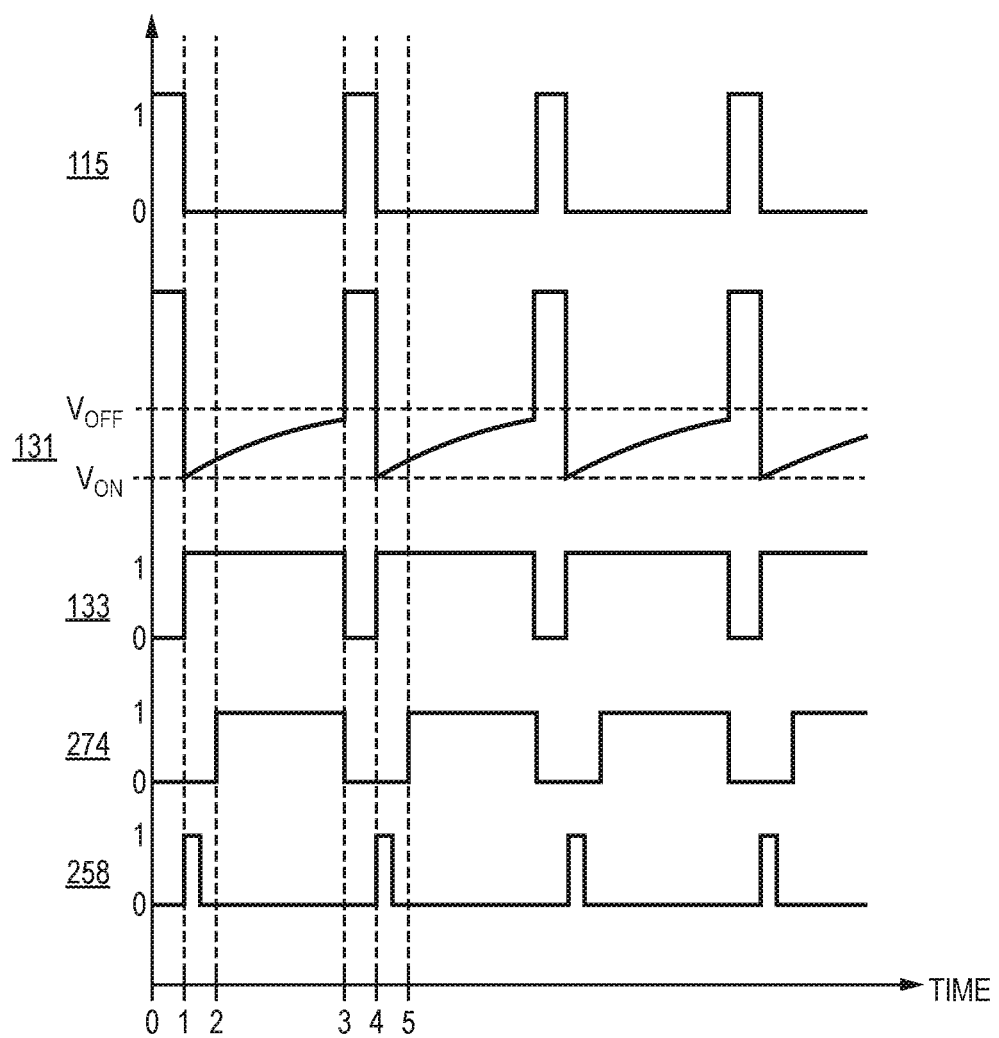

FIGS. 4a-4c illustrate operation of logic block 200 in various situations. FIG. 4a is a timing diagram with transition 299 back to state 280 being triggered by the minimum off-time elapsing in DCM operation. Time is illustrated on the horizontal, or X, axis, with the axis labelled to help illustrate transitions between states rather than in units of time. Signal 115, which is used by primary flyback controller 116 to switch primary MOSFET 114, is illustrated at the top of FIG. 4a. Signal 131 illustrates the current sense voltage at $V_{CS}$ node 131. The fixed voltage potentials of $V_{RST}$ 212, $V_{ON}$ 222, $V_{OFF}$ 232, $V_{HIGH}$ 242, and $V_{LOW}$ 252 are superimposed over a plot of the voltage potential of $V_{CS}$ node 131. In one embodiment, $V_{HIGH}$ 242 is set to 3 volts, $V_{RST}$ 212 and $V_{LOW}$ 252 are both set at 0.5 volts, $V_{OFF}$ as a voltage potential just below ground node 126, and VON is at −0.5 volts. Other voltage potential thresholds are used in other embodiments. DRV signal 133 illustrates the control signal to SR MOSFET 130 at circuit node 133. Finally, OFF_DONE signal 274 output by minimum off-time timer 270 and HIGH_DVDT signal 258 output by timer 256 are illustrated.

Beginning at time 0, logic block 200 is in state 280. Primary MOSFET 114 is turned on by signal 115 from time 0 to just before time 1. Slightly before time 1, primary flyback controller 116 turns off primary MOSFET 114 and the voltage potential of $V_{CS}$ node 131 falls relatively rapidly. Timer 256 receives transitions of HIGH_CMP signal 244 and LOW_CMP signal 254 as the voltage potential of $V_{CS}$ node 131 passes $V_{HIGH}$ 242 and $V_{LOW}$ 252. Timer 256 measures the time between the transition of HIGH_CMP signal 244 and LOW_CMP signal 254 and calculates dV/dt of $V_{CS}$ node 131. The dV/dt of $V_{CS}$ node 131 just before time 1 is above the set threshold, and timer 256 pulses HIGH_DVDT signal 258. In other embodiments, timer 256 simply compares elapsed time between HIGH_CMP signal 244 and LOW_CMP signal 254 against a time threshold without calculating dV/dt. Because logic block 200 is already in state 280, HIGH_DVDT signal 258 does not cause a state change.

The voltage potential at $V_{CS}$ node 131 continues to fall, and at time 1 reaches $V_{ON}$ 222. ON_CMP signal 224 becomes positive. Logic block 200 transitions to state 284 and asserts DRV signal 133 to turn on SR MOSFET 130. After the signal at circuit node 133 is high for the minimum on-time, logic block 200 advances to state 288, and waits for OFF_CMP signal 234.

Between time 1 and time 2, the voltage potential at $V_{CS}$ node 131 rises as magnetic energy stored in transformer 105 is discharged to secondary side 104. At time 2, the magnetic energy stored in transformer 105 is nearly fully discharged, and the voltage potential of $V_{CS}$ node 131 crosses $V_{OFF}$ 232. When $V_{CS}$ node 131 crosses $V_{OFF}$ 232, the value at OFF_CMP signal 234 toggles and logic block 200 transitions to state 292. DRV signal 133 is switched to a logic zero value to turn off SR MOSFET 130 and block energy that was transferred from transformer 105 to secondary side 104 from flowing back to ground node 126. Once the voltage potential at $V_{CS}$ node 131 surpasses $V_{RST}$ 212, logic block 200 start minimum off-time timer 270 and transitions to state 296.

Beginning at time 2, a transient ringing is observed on $V_{CS}$ node 131 in response to SR MOSFET 130 being turned off. The ringing does not include a large enough dV/dt to trigger HIGH_DVDT signal 258. The minimum off-time is set to a value that is slightly larger than the oscillation period of the ringing on $V_{CS}$ node 131. The minimum off-time does not elapse as long as the voltage oscillations on $V_{CS}$ node 131 cause the voltage potential at $V_{CS}$ node 131 to fall below $V_{RST}$ 212. Logic block 200 returns to state 292 each time $V_{CS}$ node 131 falls below $V_{RST}$ 212, and minimum off-time timer 270 is reset. Just before time 3, the oscillation minimum of $V_{CS}$ node 131 does not reach $V_{RST}$ 212. At time 3, $V_{CS}$ node 131 has gone over one full oscillation period without falling below $V_{RST}$ 212, and minimum off-time timer 270 asserts OFF_DONE signal 274. With OFF_DONE signal 274 asserted at time 3, logic block 200 advances to state 280, and waits for the next cycle.

The voltage potential at $V_{CS}$ node 131 continues ringing from time 3 to time 4. Because the ringing of $V_{CS}$ node 131 does not fall below $V_{RST}$ 212 between time 3 and time 4, logic block 200 safely assumes the transient oscillations will not cross $V_{ON}$ 222. In state 280, logic block 200 is no longer concerned with using minimum off time to blank ringing of $V_{CS}$ node 131, and will turn on SR MOSFET 130 next time the voltage potential at $V_{CS}$ node 131 falls below $V_{ON}$ 222. At time 4, the ringing of $V_{CS}$ node 131 is stopped by primary MOSFET 114 being turned on, which restarts the cycle from the situation at time 0. Electric current through primary winding 106 rises and induces $V_{CS}$ node 131 to a positive voltage potential. When primary MOSFET 114 turns off shortly before time 5, the voltage potential at $V_{CS}$ node 131 falls rapidly again and, at time 5, crosses $V_{ON}$ 222 to transition logic block 200 to state 284.

In FIG. 4a, HIGH_DVDT signal 258 is triggered when primary MOSFET 114 is turned off, but is not utilized by logic block 200 because the pulses of HIGH_DVDT signal 258 occur after minimum off-time timer 270 has elapsed and OFF_DONE signal 274 has been asserted. However, in FIG. 4b, the relative values of $V_{RST}$ 212 and voltage oscillations of $V_{CS}$ node 131 result in the minimum off-time never elapsing before the power cycle of SMPS restarts.

Primary MOSFET 114 is turned on at time 0 by signal 115 in FIG. 4b, similar to FIG. 4a. Between time 0 and time 1, transformer 105 is magnetically charged by current from $V_{BULK}$ node 110 flowing through primary winding 106. At time 0, OFF_DONE signal 274 remains low because the minimum off-time never elapsed. The reasons why off-time did not elapse will be further explained during the upcoming SMPS 100 power cycle transition. When primary MOSFET 114 turns off just prior to time 1, the voltage potential of $V_{CS}$ node 131 falls relatively rapidly until finally hitting $V_{ON}$ 222 at time 1. While the voltage at $V_{CS}$ node 131 falls, the voltage potential crosses $V_{HIGH}$ 242 and $V_{LOW}$ 252. Timer 256 measures the time between $V_{CS}$ node 131 crossing $V_{HIGH}$ 242 and $V_{CS}$ node 131 crossing $V_{LOW}$ 252, and asserts HIGH_DVDT signal 258 because the time difference indicates a dV/dt above the set threshold. A pulse of HIGH_DVDT signal 258 transitions logic block 200 to state 280 while the voltage potential at $V_{CS}$ node 131 falls. Logic block 200 continues to state 284 once the voltage potential at $V_{CS}$ node 131 reaches $V_{ON}$ 222.

Beginning at time 1, logic block 200 is in state 284 and waits for minimum on-time timer 260. Logic block 200 advances to state 288 and waits until OFF_CMP signal 234 is received. At time 2, the voltage potential at $V_{CS}$ node 131 crosses $V_{OFF}$ 232 because the magnetic energy of transformer 105 is nearly exhausted. Logic block 200 advances to state 292, turns off SR MOSFET 130, and asserts OFF_START signal 272.

Turning off SR MOSFET 130 results in ringing on $V_{CS}$ node 131 starting at time 2. The voltage oscillation magnitude of $V_{CS}$ node 131 continues to cross $V_{RST}$ 212 after time 3, unlike in FIG. 4a, and continues crossing $V_{RST}$ 212 each oscillation up until primary MOSFET 114 is switched back on at time 4. The oscillations of $V_{CS}$ node 131 across $V_{RST}$ 212 keep logic block 200 transitioning between states 292 and 296 each oscillation period, which resets minimum off-time timer 270 each time state 292 is reached. Primary MOSFET 114 is turned on by signal 115 before the minimum off-time expires, while OFF_DONE signal 274 is still low.

While primary MOSFET 114 is on from time 4 to just before time 5, and transformer 105 is being magnetically charged, logic block 200 remains in state 296. Neither of OFF_DONE signal 274 and HIGH_DVDT signal 258 have been received to transition logic block 200 back to state 280. The ringing at $V_{CS}$ node 131 crosses $V_{RST}$ 212 each oscillation period from time 2 to time 4, and the dV/dt of the ringing is not high enough to enable HIGH_DVDT signal 258. The charging of transformer 105 induces a positive voltage potential at $V_{CS}$ node 131 that is greater than $V_{RST}$ 212 and finally stops oscillations of $V_{CS}$ node 131 crossing $V_{RST}$ 212.

Just before time 5, primary MOSFET 114 is turned off, and the voltage at $V_{CS}$ node 131 begins to fall relatively rapidly. The dV/dt of $V_{CS}$ node 131 just prior to time 5 is above a threshold for timer 256 to set HIGH_DVDT signal 258, and logic block 200 transitions to state 280. At time 5, the voltage potential at $V_{CS}$ node 131 reaches $V_{ON}$ 222. Because HIGH_DVDT signal 258 caused logic block 200 to take transition 299 to state 280 just prior to time 5, logic block 200 continues on to state 284 once $V_{CS}$ node 131 hits $V_{ON}$ 222 at time 5.

Since the on-time of primary MOSFET 114 is similar to or less than the oscillation period of $V_{CS}$ node 131, OFF_DONE signal 274 is asserted by minimum off-time timer 270 after time 5. Off-time timer 270 expires even though the voltage potential at $V_{CS}$ node 131 is below $V_{RST}$ 212 because HIGH_DVDT signal 258 transitioned logic block 200 out of states 296. Without timer 256 calculating dV/dt of $V_{CS}$ node 131 and generating HIGH_DVDT signal 258, SR controller 132 would not properly turn on SR MOSFET 130 at time 5. If logic block 200 depended on only minimum off-time timer 270 to transition from state 296 to state 280, logic block 200 would remain in state 296 while MOSFET 114 were on. Just prior to time 5, logic block 200 would be transitioned to state 292 by $V_{CS}$ node 131 going below $V_{RST}$ rather than transitioning to state 280 because of HIGH_DVDT signal 258.

SR MOSFET 130 is potentially never turned on when HIGH_DVDT signal 258 is not used because the voltage potential of $V_{CS}$ node 131 may never be above $V_{RST}$ 212 for longer than the minimum off-time at any point during the power cycle of SMPS 100. When SR MOSFET 130 is not turned on properly, rectification is performed by the body diode of the SR MOSFET, and efficiency of SMPS 100 is reduced. The problem arises because the minimum off-time set based on oscillation frequency is greater than the on-time of primary MOSFET 114. One reason for the on-time of primary MOSFET 114 being reduced to less than the minimum off-time is if a reduction of output voltage potential at $V_{OUT}$ node 124 reduces the energy needed to be transferred to secondary side 104 each power cycle.

At time 5, OFF_DONE signal 274 remains low because the off-time does not expire prior to signal 115 going low and turning off primary MOSFET 114. However, SR controller 132 correctly turns on SR MOSFET 130 because the high dV/dt magnitude of $V_{CS}$ node 131 caused by primary MOSFET 114 turning off is detected by timer 256. HIGH_DVDT signal 258 results in logic block 200 ignoring minimum off-time timer 270 and advancing to state 280 even when the minimum off-time has not been exceeded.

FIG. 4c illustrates operation of SR controller 132 in CCM with the on-time of primary MOSFET 114 shorter than the minimum off-time of SR MOSFET 130. At time 0, primary MOSFET 114 is switched on to enable current through primary winding 106 and charge transformer 105. The rise in voltage potential at $V_{CS}$ node 131 when turning on primary MOSFET 114 starts minimum off-time timer 270. Primary MOSFET 114 is switched off again just prior to time 1 to allow the magnetic energy stored in transformer 105 to be output to secondary side 104. The high dV/dt of $V_{CS}$ node 131 after primary MOSFET 114 is switched off triggers timer 256 to pulse HIGH_DVDT signal 258 at time 1. The pulse of HIGH_DVDT signal 258 transitions logic block 200 to state 280, and then logic block 200 transitions to state 284 once $V_{CS}$ node 131 crosses $V_{ON}$ 222 at time 1. Logic block 200 is transitioned to state 280 when HIGH_DVDT signal 258 is asserted by timer 256 before OFF_DONE signal 274 is asserted by the expiring of the minimum off-time.

Between time 1 and time 3 in FIG. 4c, SR MOSFET 130 is on and induced current in secondary winding 108 is flowing from ground node 126 to $V_{OUT}$ node 124. At time 2, the minimum off-time is finally exceeded and OFF_DONE signal 274 is asserted. However, logic block 200 has already advanced past state 296 and OFF_DONE signal 274 does not cause a state transition.

In FIG. 4c, SMPS 100 is operating in CCM, so the voltage potential at $V_{CS}$ node 131 does not reach $V_{OFF}$ 232 based on the natural discharging of transformer 105 to secondary side 104. Rather, primary flyback controller 116 turns on primary MOSFET 114 at time 3 before $V_{CS}$ node 131 crosses $V_{OFF}$ 232. The minimum on-time of SR MOSFET 130 has previously been exceeded, and logic block 200 is in state 288 prior to time 3. Primary MOSFET 114 turning on at time 3 forces $V_{CS}$ node 131 to a relatively high voltage potential, which crosses $V_{OFF}$ 232 and transitions logic block 200 to state 292.

Primary MOSFET 114 turning on at time 3 in FIG. 4c, and transitioning logic block 200 to state 292, further transitions logic block 200 to state 296 and starts minimum off-time timer 270 because time 3 is when the voltage potential of $V_{CS}$ node 131 transitions above $V_{RST}$ 212. Primary MOSFET 114 turns back off at time 4, which is before the minimum off-time expires. OFF_DONE signal 274 remains low. However, the rapidly falling voltage potential at $V_{CS}$ node 131 when primary MOSFET 114 is turned off at time 4 is detected by timer 256. Timer 256 generates a pulse of HIGH_DVDT signal 258 which advances logic block 200 to state 280. The voltage potential of $V_{CS}$ node 131 continues to fall to $V_{ON}$ 222, which advances logic block 200 to state 284 and turns SR MOSFET 130 back on, at approximately time 4. SMPS 100 operates properly in CCM mode even when the pulse width of control signal 115 to primary MOSFET 114 is shorter than the minimum off-time of SR MOSFET 130 because timer 256 detects a high dV/dt magnitude of $V_{CS}$ node 131.

Figure 5A:
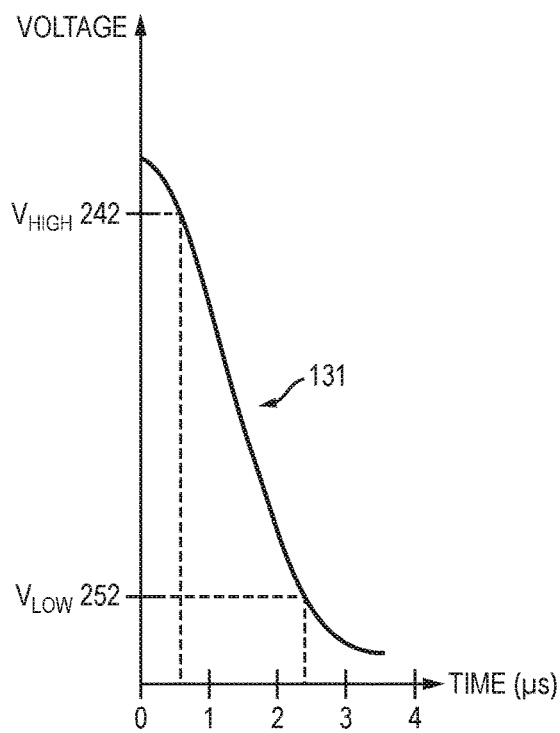
FIGS. 5a-5b illustrate calculating dV/dt for discerning between transient ringing and primary MOSFET transitions.
Figure 5B:
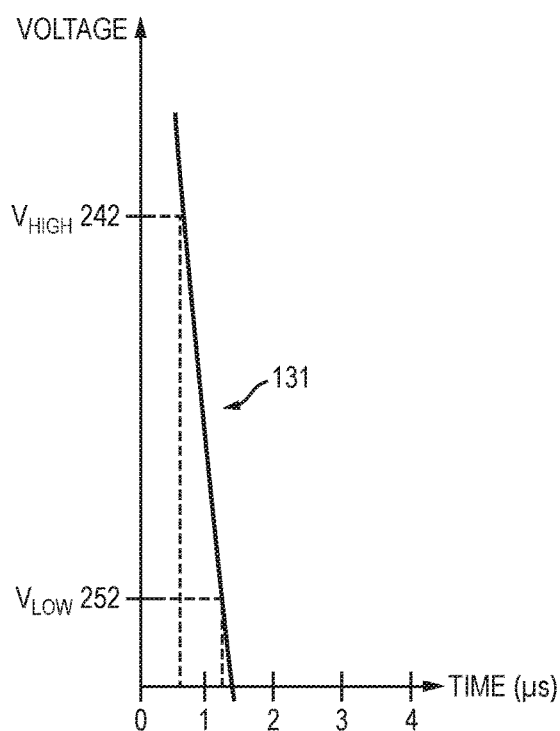

FIGS. 5a-5b show timer 256 operating during transient oscillations of $V_{CS}$ node 131 and during a turn-on event of primary MOSFET 114. FIG. 5a shows the voltage of $V_{CS}$ node 131 falling during a ringing, e.g., between time 2 and time 4 of FIG. 4a. The voltage potential of $V_{CS}$ node 131 crosses $V_{HIGH}$ 242 at approximately 0.7 μs and crosses $V_{LOW}$ 252 at approximately 2.2 μs. Transitions of HIGH_CMP signal 244 and LOW_CMP signal 254 seen by timer 256 are separated by approximately 1.5 μs. Assuming $V_{HIGH}$ 242 is 3 volts and $V_{LOW}$ 252 is 0.5 volts, dV/dt in FIG. 5a is calculated to be approximately 2.5 volts divided by 1.5 μs, or 1.67 V/μs.

In some embodiments, timer 256 is started at approximately 0.7 μs by the voltage potential of $V_{CS}$ node 131 crossing $V_{HIGH}$ 242. Timer 256 runs until $V_{CS}$ node 131 crosses $V_{LOW}$ 252 at approximately 2.2 μs. The timing mechanism of timer 256 indicates that 1.5 μs elapsed, and timer 256 compares the elapsed time against a time threshold to determine whether to assert HIGH_DVDT signal 258.

FIG. 5b shows the voltage of $V_{CS}$ node 131 falling during a turn-off event of primary MOSFET 114, e.g., just prior to time 1 in FIG. 4a. The energy stored in transformer 105 causes the voltage potential of $V_{CS}$ node 131 to fall more rapidly than the transient ringing in FIG. 5a. The voltage potential of $V_{CS}$ node 131 cross $V_{HIGH}$ 242 at approximately 0.8 μs, and crosses $V_{LOW}$ 252 at approximately 1.2 μs. Again assuming $V_{HIGH}$ 242 equal to 3 volts and $V_{LOW}$ 252 equal to 0.5 volts, dV/dt of $V_{CS}$ node 131 is approximately 2.5 volts divided by 0.4 μs, or 6.25 V/μs.

A detection threshold for asserting HIGH_DVDT signal 258 of 5 V/μs would accurately distinguish between the ringing of FIG. 5a and the switching event of FIG. 5b. In other embodiments, a time threshold is used instead of a dV/dt magnitude threshold, and HIGH_DVDT signal 258 is asserted if the time between $V_{CS}$ node 131 crossing $V_{HIGH}$ 242 and $V_{CS}$ node 131 crossing $V_{LOW}$ 252 is below the threshold. The transition in FIG. 5b results in a dV/dt that is over the threshold, and timer 256 asserts HIGH_DVDT signal 258 to transition logic block 200 to state 280. The transition shown in FIG. 5a does not meet the threshold, and logic block 200 remains in state 296. The threshold used by timer 256 may be different for different SMPS embodiments. A threshold is selected to substantially ensure that transient oscillations do not meet the threshold for asserting HIGH_DVDT signal 258, while transitions of primary MOSFET 114 do satisfy the threshold.

SR controller 132 monitors $V_{CS}$ node 131 both for minimum off-time elapsing, and for dV/dt magnitude. Monitoring for dV/dt allows logic block 200 to transition properly in cases where the off-time may not elapse before SR MOSFET 130 should be turned on, e.g., when the pulse width of control signal 115 is less than the minimum off-time in low-voltage applications. When $V_{CS}$ node 131 has a dV/dt magnitude greater than a defined threshold, the minimum off-time is shortened and SR MOSFET 130 can be turned on when $V_{ON}$ 222 is crossed by $V_{CS}$ node 131. Discriminating between transient ringing and switching of primary MOSFET 114 is possible because the slope of voltage potential on $V_{CS}$ node 131 is significantly greater when primary MOSFET 114 is switched compared to transient ringing.

Using minimum off-time calculations for transitioning logic block 200 is useful when SMPS 100 sees a light load because the dV/dt magnitude of $V_{CS}$ node 131 after primary MOSFET 114 switches is reduced during light load. Utilizing both minimum off-time and dV/dt detection allows logic block 200 of SR controller 132 to transition between states properly in a wide range of usage scenarios. Detection of dV/dt is used to shorten the minimum off-time interval rather than being used as the sole indicator of primary MOSFET 114 switching. SR controller 132 with both dV/dt and minimum off-time detection simplifies SR controller 132 for use in applications that require a wide range of possible $V_{OUT}$ voltages. Because the minimum off-time interval is shortened automatically when a high dV/dt is detected, precision in setting the minimum off-time is less important.

While one or more embodiments have been illustrated and described in detail, the skilled artisan will appreciate that modifications and adaptations to those embodiments may be made without departing from the scope of the present disclosure.

What is claimed:

1. A method of generating a voltage signal using a controller, comprising:
    comparing a voltage potential at a current sense input of the controller against a first threshold;
    comparing the voltage potential against a second threshold;
    measuring a first amount of time between the voltage potential crossing the first threshold and the voltage potential crossing the second threshold; and
    asserting a synchronous rectification (SR) control output of the controller after at least one of either a minimum off-time of the SR control output is exceeded or the first amount of time is measured below a third threshold.

2. The method of claim 1, further including:
    measuring an off-time of the SR control output using a minimum off-time timer; and
    resetting the minimum off-time timer when the voltage potential is below a reset threshold.

3. The method of claim 1, wherein measuring the first amount of time below the third threshold allows the SR control output to be asserted before the minimum off-time is exceeded.

4. The method of claim 1, further including measuring the first amount of time using a timer circuit of the controller.

5. The method of claim 1, further including asserting the SR control output when the voltage potential is below a turn-on threshold.

6. The method of claim 1, further including deasserting the SR control output when the voltage potential is above a turn-off threshold.

7. A method of generating a voltage signal, comprising:
    starting a minimum off-time timer;
    measuring a voltage potential of a current sense input; and
    asserting a synchronous rectification (SR) control output after a rate of change over time of the voltage potential exceeds a first threshold.

8. The method of claim 7, further including asserting the SR control output before the minimum off-time timer expires.

9. The method of claim 7, further including asserting the SR control output when the voltage potential falls below a second threshold.

10. The method of claim 7, further including resetting the minimum off-time timer when the voltage potential falls below a second threshold.

11. The method of claim 7, further including deasserting the SR control output after a minimum on-time is exceeded.

12. The method of claim 7, further including measuring the rate of change over time of the voltage potential by:
   starting a timer when the voltage potential crosses a second threshold; and
   determining a value of the timer when the voltage potential crosses a third threshold.

13. The method of claim 12, further including comparing the value of the timer against the first threshold.

14. A power conversion circuit controller, comprising:
   a current sense input;
   a first comparator including a first input coupled to the current sense input and a second input of the first comparator coupled to a first reference voltage potential;
   a second comparator including a first input coupled to the current sense input and a second input of the second comparator coupled to a second reference voltage potential; and
   a timer coupled to an output of the first comparator and an output of the second comparator and configured to measure an amount of time between assertion of the output of the first comparator and assertion of the output of the second comparator.

15. The power conversion circuit controller of claim 14, further including a logic block comprising a first input of the logic block coupled to an output of the timer and an output terminal of the logic block coupled to a synchronous rectification (SR) control output.

16. The power conversion circuit controller of claim 15, further including a minimum off-time timer coupled to the logic block.

17. The power conversion circuit controller of claim 16, wherein the logic block is configured to assert a signal to the SR control output terminal after at least one of either the output of the timer is asserted or the minimum off-time timer expires.

18. The power conversion circuit controller of claim 14, wherein the timer is configured to be started by the first comparator.

19. The power conversion circuit controller of claim 18, wherein the timer is configured to assert an output of the timer if a transition of the output of the second comparator is detected with a value of the timer under a threshold value.

20. The power conversion circuit controller of claim 14, wherein the second reference voltage potential is a lower voltage potential than the first reference voltage potential.

* * * * *